(12) United States Patent
Takamura

(10) Patent No.: US 9,218,647 B2
(45) Date of Patent: Dec. 22, 2015

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Akihiro Takamura, Kokubunji (JP)

(73) Assignee: CANON KABUSHIKI KAISHA, Tokyo (JP)

(*) Notice: Subject to any disclaimer, the term of this patent is extended or adjusted under 35 U.S.C. 154(b) by 289 days.

(21) Appl. No.: 13/849,632

(22) Filed: Mar. 25, 2013

(65) Prior Publication Data
US 2013/0259398 A1 Oct. 3, 2013

(30) Foreign Application Priority Data

Mar. 30, 2012 (JP) ................................. 2012-082089

(51) Int. Cl.
*G06T 5/00* (2006.01)
*G06T 1/20* (2006.01)
(52) U.S. Cl.
CPC .. *G06T 5/002* (2013.01); *G06T 1/20* (2013.01)
(58) Field of Classification Search
CPC .................................................. G06F 2101/06
See application file for complete search history.

(56) References Cited

U.S. PATENT DOCUMENTS

| | | | | |
|---|---|---|---|---|
| 3,952,187 | A * | 4/1976 | Robinson et al. ............. | 708/442 |
| 4,949,295 | A * | 8/1990 | Stearns ......................... | 708/504 |
| 5,686,960 | A * | 11/1997 | Sussman et al. ............ | 348/218.1 |
| 5,774,600 | A * | 6/1998 | Strongin et al. .............. | 382/276 |
| 6,385,633 | B1 * | 5/2002 | Schmidl ........................ | 708/441 |
| 7,813,585 | B2 * | 10/2010 | Higurashi et al. ............. | 382/275 |
| 2001/0025293 | A1 * | 9/2001 | Inui ............................... | 708/650 |
| 2004/0035935 | A1 * | 2/2004 | Takahashi et al. ........ | 235/462.09 |
| 2007/0257824 | A1 * | 11/2007 | Harada et al. .................. | 341/51 |

FOREIGN PATENT DOCUMENTS

JP          6-149993 A          5/1994

OTHER PUBLICATIONS

Miro, C., Lafage, A., Nguyen-Phuc, Q. L., & Mathieu, Y. (Dec. 1998). Hardware implementation of perspective transformations on MPEG-4 video objects. In Electronic Imaging'99 (pp. 102-112). International Society for Optics and Photonics.*
Translation IDS JP6149993.*

* cited by examiner

*Primary Examiner* — Michelle Entezari
(74) *Attorney, Agent, or Firm* — Carter, DeLuca, Farrell & Schmidt, LLP

(57) ABSTRACT

An image processing apparatus that generates an output image by deforming an input image by coordinate transformation, comprises a divisor calculation unit calculates a minimum value and a maximum value of a divisor, used in division operation of coordinate transformation; a coefficient calculation unit obtains a range of the divisor in a way that a result of the division operation becomes equal to or smaller than an allowable error, and calculates a normalization parameter by dividing a minimum value of the range by the minimum value of the divisor; a parameter adjustment unit calculates an adjustment parameter used in the coordinate transformation, and outputs the adjustment parameter; and an image deformation processing unit performs transformation processing of the coordinate information using the adjustment parameter, and outputs a result of the transformation processing.

11 Claims, 3 Drawing Sheets

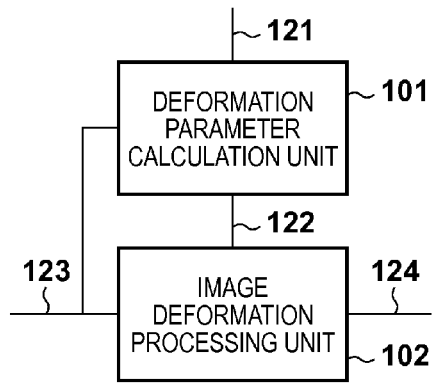
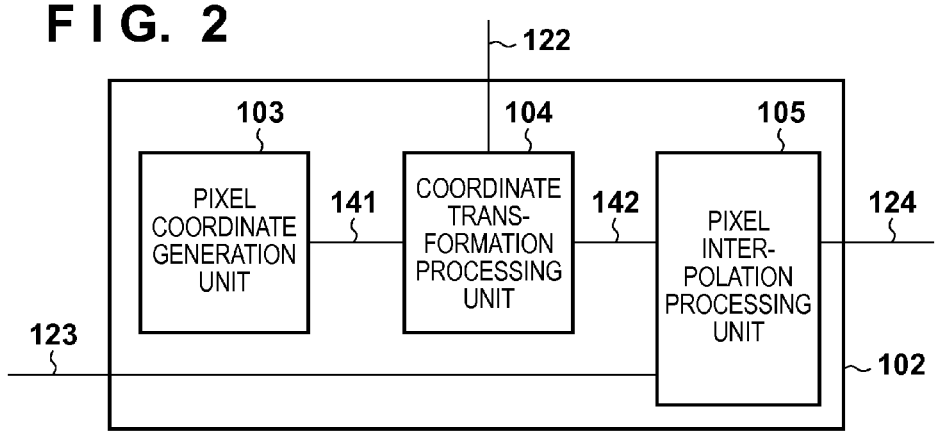
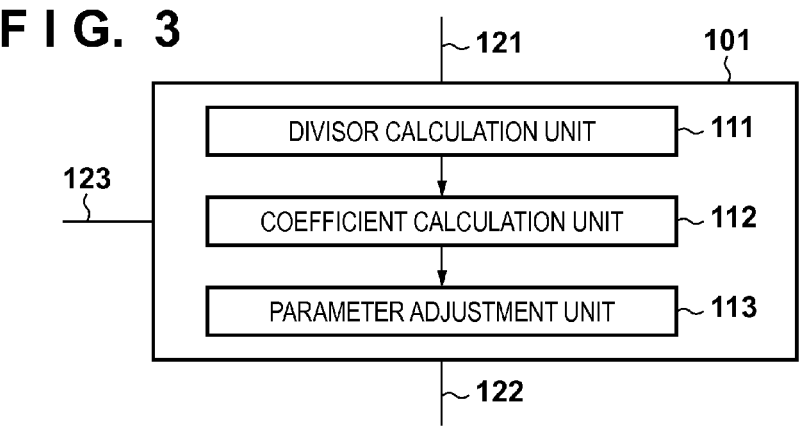

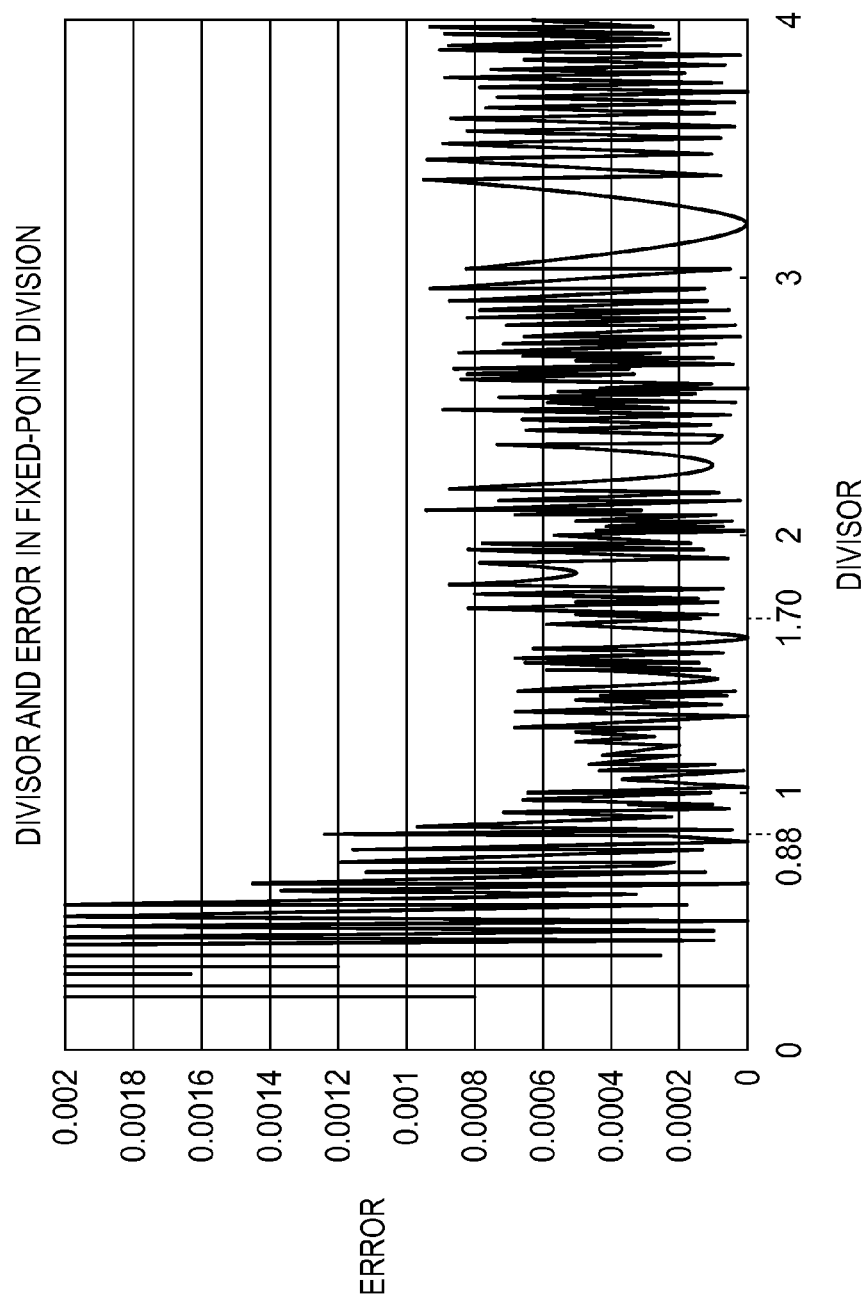

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus, an image processing method, and a storage medium.

2. Description of the Related Art

In calculation processing of image processing apparatuses that perform image deformation, many apparatuses first store input pixels, corresponding to a screen, in memory. With the use of inverse transformation of coordinate transformation, coordinate values of input pixels are calculated based on coordinate values of output pixels in order of scanning the output pixels. Furthermore, based on the integer part of the input-pixel coordinates obtained by inverse transformation, neighborhood pixels of an input pixel are read out of the memory, and with the use of the decimal part of the coordinates of the input pixel and neighborhood pixels, interpolation is performed to determine an output pixel value. By repeatedly performing the above-described operations, image processing for image deformation is realized.

Meanwhile, in image processing apparatuses for image deformation that can decrease the peak value of a necessary memory band, output coordinates are calculated by performing coordinate transformation on input pixels that are input in order of scanning. Based on the integer part of the output coordinates, the storage destination address in the memory is calculated. Furthermore, by performing inverse transformation of coordinate transformation on the integer part of the output coordinates, coordinates in the input image are obtained. When the integer part of the coordinates obtained by inverse transformation agrees with the coordinates of the original input pixel, an output pixel value is obtained by interpolation calculation using the input pixel, the neighborhood pixels, and the decimal part of the coordinates obtained by inverse transformation of coordinate transformation. The obtained pixel value is stored in the storage destination address obtained before.

In order to achieve the designated deformed shape as closely as possible and also for the sake of interpolation calculation, it is better to perform the aforementioned coordinate transformation and the inverse transformation of coordinate transformation as highly precisely as possible (hereinafter these transformation will collectively be referred to as "coordinate calculation"). However, in order to perform projection transformation in image deformation, high-precision addition, multiplication, and division are necessary in coordinate calculation. In execution of such coordinate calculation, sometimes sufficient calculation precision cannot be achieved because of problems in the amount of circuits or operating frequencies in a case of hardware, and performance problems in a case of software.

In view of the aforementioned problems, the second embodiment of Japanese Patent Laid-Open No. 6-149993 discloses a method of performing approximation calculation in the neighborhood of a pixel of interest when high-precision coordinate calculation is performed. It also discloses that, when division is performed, both divisor and dividend are doubled until the MSB (Most Significant Bit) of the divisor becomes 1.

Because approximation calculation is performed in the method disclosed in Japanese Patent Laid-Open No. 6-149993, it is difficult to achieve high-precision calculation for high-resolution images or large image deformation. Furthermore, because doubling both divisor and dividend until the MSB of the divisor becomes 1 must to be performed for each division of coordinate calculation, it causes problems of an increased amount of calculation and large power consumption.

SUMMARY OF THE INVENTION

The present invention has been made in view of the above-described problems, and provides an image processing technique that can improve calculation precision of coordinate transformation when performing image deformation.

According to one aspect of the present invention, there is provided an image processing apparatus that generates an output image by deforming an input image by coordinate transformation, comprising: a divisor calculation unit configured to calculate a minimum value and a maximum value of a divisor, used in division operation of coordinate transformation, based on coordinate information of a pixel constituting the input image; a coefficient calculation unit configured to, based on a relation between a divisor and an error in division operation, obtain a range of the divisor in a way that a result of the division operation becomes equal to or smaller than an allowable error, and calculate a normalization parameter by dividing a minimum value of the range by the minimum value of the divisor calculated by the divisor calculation unit; a parameter adjustment unit configured to calculate an adjustment parameter, used in the coordinate transformation, by multiplying an input parameter by the normalization parameter, and output the adjustment parameter; and an image deformation processing unit configured to perform transformation processing of the coordinate information using the adjustment parameter, and output a result of the transformation processing.

According to the present invention, it is possible to provide an image processing technique that can improve calculation precision of coordinate transformation when performing image deformation.

Further features of the present invention will become apparent from the following description of exemplary embodiments with reference to the attached drawings.

BRIEF DESCRIPTION OF THE DRAWINGS

FIG. 1 is an explanatory diagram showing an exemplary configuration of an image processing apparatus according to an embodiment of the present invention;

FIG. 2 is a diagram showing an exemplary configuration of an image deformation processing unit;

FIG. 3 is a diagram showing an exemplary configuration of a deformation parameter calculation unit;

FIG. 4 is a graph showing exemplified divisors and errors in fixed-point division;

DESCRIPTION OF THE EMBODIMENTS

Figure 5:
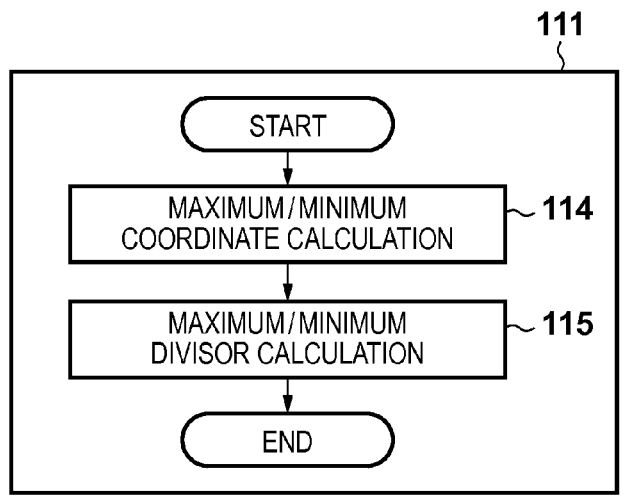
FIG. 5 is an explanatory diagram showing processing of a divisor calculation unit.

Embodiments of the present invention will be described hereinafter in detail, with reference to the accompanying drawings. It is to be understood that the following embodiments are not intended to limit the claims of the present invention, and that not all of the combinations of the aspects that are described in the following embodiments are necessarily required with respect to the configuration to solve the problems according to the present invention.

[First Embodiment]

The present embodiment describes, as input-image deformation processing of an image processing apparatus performed by calculation including division, a configuration for performing coordinate transformation of an input image and calculating pixel coordinates of an output image. The present embodiment is also applicable to the method of image deformation, which uses inverse coordinate transformation for calculating input-pixel coordinates corresponding to output-pixel coordinates.

FIG. 1 is an explanatory diagram showing an exemplary overall configuration of an image processing apparatus according to the present embodiment. The image processing apparatus comprises a deformation parameter calculation unit 101 for calculating a parameter used in input-image deformation processing, and an image deformation processing unit 102 for performing image deformation processing using the calculated parameter. The deformation parameter calculation unit 101 receives a high-precision deformation parameter 121, and outputs a deformation parameter 122 converted to appropriate bit precision that can be inputted to the image deformation processing unit 102. The image deformation processing unit 102 receives the deformation parameter 122 and input pixels 123 constituting an input image, performs deformation processing (coordinate transformation) of the input pixels 123 using the deformation parameter 122, and outputs the deformation processing result as output pixels (output image) 124.

FIG. 2 shows an exemplary configuration of the image deformation processing unit 102. The image deformation processing unit 102 comprises a pixel coordinate generation unit 103, a coordinate transformation processing unit 104, and a pixel interpolation processing unit 105. The pixel coordinate generation unit 103 generates a coordinate array of input pixels. For instance, if input pixels having three pixels in the horizontal direction and two pixels in the vertical direction are inputted in order of raster scanning, the pixel coordinate generation unit 103 sequentially generates (x, y)=(0, 0), (1, 0), (2, 0), (0, 1), (1, 1), (2, 1). The pixel coordinate generation unit 103 outputs the data as the pixel coordinates (coordinate information) 141. In a case of the method that realizes image deformation by calculating input-pixel coordinates corresponding to output-pixel coordinates, the pixel coordinate generation unit 103 generates a coordinate array of output pixels.

The coordinate transformation processing unit 104 performs projection transformation when the pixel coordinates 141 outputted by the pixel coordinate generation unit 103 and the deformation parameter 122 are inputted, and outputs transformed pixel coordinates 142 as a projection transformation result of the pixel coordinates 141. Although the present embodiment describes projection transformation as an example, the invention is applicable to other geometric transformation besides projection transformation as long as image deformation (coordinate transformation) including division is performed.

Projection transformation is expressed by 3×3 matrix using $m_{ij}$ (i=1 to 3, j=1 to 3) as a parameter. The coordinate transformation processing unit 104 executes the following calculation on the pixel coordinates (xi, yi) to obtain transformed pixel coordinates (xo, yo). The deformation parameter (adjustment parameter) 122 is the parameter $m_{ij}$ (i=1 to 3, j=1 to 3), which is used for the calculation processing. Note that the processes can be simplified by collectively performing the processing of the pixel coordinate generation unit 103 and coordinate transformation processing unit 104.

$$xo0 = m11 \cdot xi + m12 \cdot yi + m13$$

$$yo0 = m21 \cdot xi + m22 \cdot yi + m23$$

$$zo0 = m31 \cdot xi + m32 \cdot yi + m33$$

$$xo = xo0/zo0$$

$$yo = yo0/zo0.$$

In executing the above calculation, the bit width of the calculation is prescribed in a case of either hardware installation or software installation. Particularly, in order to reduce the amount of circuits for division where calculation is complicated, or in order to reduce the number of processing cycles for division, it is possible to realize the calculation with as small number of bits of a divisor as possible for achieving the necessary output calculation precision. The divider achieves different calculation precision depending on the range of the divisor. For instance, FIG. 4 shows divisors and errors in fixed-point division. In the example in FIG. 4, assuming that an allowable error is equal to or lower than 0.0008, the divisor must be within the range from 0.88 to 1.70. In the present embodiment, the deformation parameter calculation unit 101 multiplies the divisor and dividend by a constant in a way that the divisor falls within this range.

The pixel interpolation processing unit 105 receives the transformed pixel coordinates 142 (coordinate information of transformed pixels) and the input pixels 123, and performs interpolation calculation of the pixel values of transformed pixels based on the coordinate information of the transformed pixels obtained by coordinate transformation processing. The pixel interpolation processing unit 105 outputs the result of interpolation calculation as output pixels 124. For instance, in bi-linear interpolation of 2×2 pixels, assume that the integer part of the transformed pixel coordinates 142 is (x, y). With respect to pixel values of four points of the integer part (x, y), (x+1, y), (x, y+1), (x+1, y+1), a weighted average of the transformed pixel coordinates 142 is calculated as an output pixel value.

FIG. 3 shows an exemplary configuration of the deformation parameter calculation unit 101. The deformation parameter calculation unit 101 comprises a divisor calculation unit 111, a coefficient calculation unit 112, and a parameter adjustment unit 113. Assume that the high-precision deformation parameter 121 inputted to the deformation parameter calculation unit 101 is a projection transformation parameter that is expressed with double precision. The deformation parameter 122 outputted by the deformation parameter calculation unit 101 is a parameter that determines the calculation bit width of the coordinate transformation processing unit 104. Although the present embodiment describes the deformation parameter as a projection transformation parameter expressed in a signed fixed-point system, the expression system of the parameter is not limited to this, and the parameter can be expressed in other systems. The deformation parameter calculation unit 101 may be configured with hardware, or with a CPU, memory, I/O, and a program in the memory.

The processing flow of the deformation parameter calculation unit 101 is described with reference to FIGS. 5 to 7. Although the present embodiment describes a case where the deformation parameter calculation unit 101 is realized by being installed in hardware, in a case where the deformation parameter calculation unit 101 is realized by a CPU, memory, I/O, and a program in the memory, the steps of each flow correspond to the steps of the program in the memory.

FIG. 5 is an explanatory diagram showing processing of the divisor calculation unit 111. First, a maximum/minimum coordinate calculation unit 114 outputs coordinates having a possibility that the divisor becomes minimum or maximum. In projection transformation, the case where the divisor possibly becomes maximum is when each of the x and y coordinates of the input pixel 123 becomes minimum or maximum (because there is a case where the parameter is negative, the divisor may become maximum when the x and y coordinates are minimum).

Next, a maximum/minimum divisor calculation unit 115 obtains a divisor with respect to the coordinates having a possibility that the divisor, which is outputted by the maximum/minimum coordinate calculation unit 114, becomes minimum or maximum. As the present embodiment adopts projection transformation, when x and y coordinates are xi and yi, the divisor zo is obtained as follows. Although the high-precision deformation parameter 121 is expressed by dij (i=1 to 3, j=1 to 3: d11 to d33), the following equation only uses d31 to d33.

$$Zo0 = d31 \cdot xi + d32 \cdot yi + d33$$

The divisor is obtained with respect to the coordinates having a possibility that the divisor becomes minimum, and the coordinates having a possibility that the divisor becomes maximum. The minimum value of the divisor is defined as zomin, and the maximum value of the divisor is defined as zomax. Zomax and zomin are outputted by the maximum/minimum divisor calculation unit 115.

Figure 6:
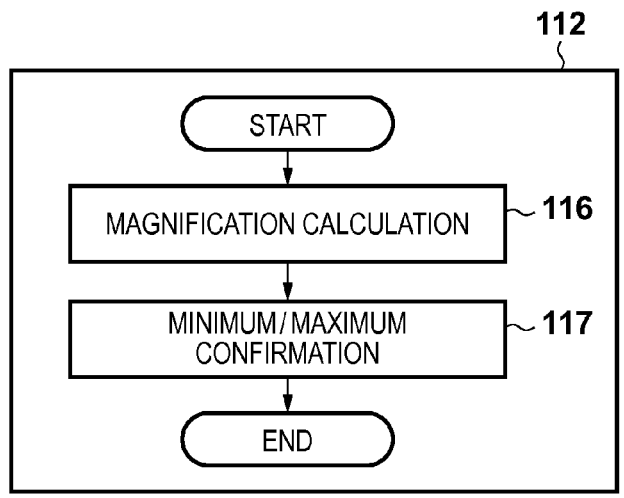
FIG. 6 is an explanatory diagram showing processing of a coefficient calculation unit.

FIG. 6 is an explanatory diagram showing processing of the coefficient calculation unit 112. The coefficient calculation unit 112 obtains the relation between a divisor and an error in division calculation of the coordinate transformation processing unit 104, and sets the range (dmin (minimum value of divisor)≤d≤dmax (maximum value of divisor)) of the divisor d, which generates an error equal to or smaller than an allowable error. A magnification calculation unit 116 obtains a ratio k (=dmin/zomin:normalization parameter) of zomin, which is outputted by the maximum/minimum divisor calculation unit 115, to the minimum value dmin of the range of the divisor d.

Next, a minimum/maximum confirmation unit 117 determines whether the multiplication result of zomax and the ratio k, calculated by the magnification calculation unit 116, is equal to or smaller than the maximum value dmax of the divisor in the division operation of the coordinate transformation processing unit 104 (k·zomax≤dmax). When this inequality is not satisfied, the operation error in the division operation of the coordinate transformation processing unit 104 exceeds the allowable range. It indicates that the inputted high-precision deformation parameter 121 is inappropriate, or operation precision of the coordinate transformation processing unit 104 is inappropriate. When it can be assured that the high-precision deformation parameter 121 always satisfies the inequality (k·zomax≤dmax), the processing of the minimum/maximum confirmation unit 117 can be omitted. When k·zomax>dmax stands, the minimum/maximum confirmation unit 117 can inform that at least either the high-precision deformation parameter 121 is inappropriate, or operation precision of the coordinate transformation processing unit 104 is inappropriate.

Figure 7:
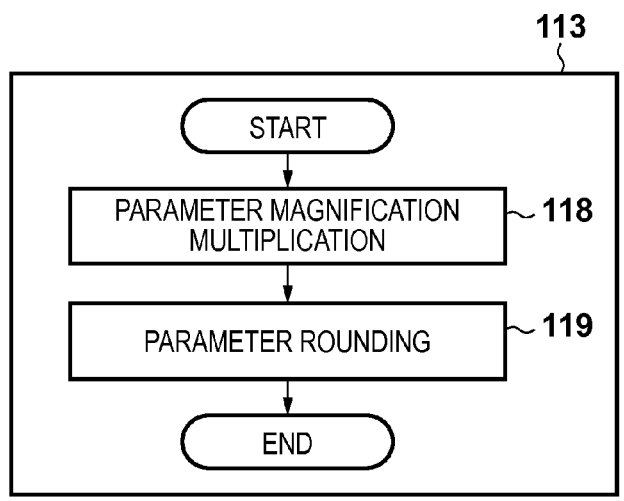
FIG. 7 is an explanatory diagram showing processing of a parameter adjustment unit.

FIG. 7 is an explanatory diagram showing processing of the parameter adjustment unit 113. First, a parameter magnification multiplication unit 118 multiplies d11 to d33 of the high-precision deformation parameter 121 by the ratio k (normalization parameter), calculated by the magnification calculation unit 116. For instance, for parameter d11, f11=k·d11 is calculated. The parameter adjustment unit 113 calculates parameters, multiplied by the normalization parameter, as the adjustment parameter fij (i=1 to 3, j=1 to f: f11 to f33) to be used for coordinate transformation.

A parameter rounding unit 119 performs rounding of the bit precision of the parameters f11 to f33 to the bit precision of the deformation parameter 122. For instance, to obtain data in the fixed-point system, left-shifting is performed for the number of digits corresponding to the decimal part of the deformation parameter 122, 0.5 is added for rounding, and the integer part alone is extracted.

After the above-described processing is completed, the deformation parameter calculation unit 101 outputs the deformation parameter 122 (adjustment parameter) (mij (i=1 to 3, j=1 to 3: m11 to m33) to the image deformation processing unit 102.

As described above, in the image processing apparatus that performs image deformation including division, when a deformation parameter is calculated, the minimum and maximum values of the divisor are calculated with respect to the coordinates within image deformation. Next, a coefficient (normalization parameter) to be multiplied by the minimum and maximum values of the divisor is calculated in a way that an error becomes smaller than the allowable error in the division operation. The parameter of the divisor and dividend of the division in coordinate transformation is multiplied by the calculated coefficient.

Accordingly, it is possible to improve operation precision of coordinate calculation without changing the hardware configuration, without increasing the number of circuits, or without decreasing the operating frequencies. Furthermore, in order to improve operation precision of coordinate calculation, the number of changes in the installed software can be minimized.

[Other Embodiments]

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-082089, filed Mar. 30, 2012, which is hereby incorporated by reference herein in its entirety.

What is claimed is:

1. An image processing apparatus that generates an output image by a deformation process including a coordinate transformation on an input image, comprising a computer configured to implement:

an input unit configured to input a deformation parameter;

a divisor calculation unit configured to calculate a minimum value of a divisor for the coordinate transformation based on the deformation parameter on the input image, in accordance with a divisor used in a division operation for the coordinate transformation based on the deformation parameter on a maximum coordinate value and a minimum coordinate value among a plurality of coordinate values in the input image;

a coefficient calculation unit configured to, based on a relation between a divisor and an error in a division operation, obtain a range of the divisor in a way that a result of the division operation becomes equal to or smaller than an allowable error, and calculate a ratio by dividing a minimum value of the range by the minimum value of the divisor calculated by the divisor calculation unit;

a parameter adjustment unit configured to calculate an adjustment parameter, used in the coordinate transformation on the input image, based on a result of multiplying the deformation parameter input by the input unit by the ratio calculated by the coefficient calculation unit, and execute round processing on the adjustment parameter;

an image deformation processing unit configured to perform the deformation process including the coordinate transformation of the plurality of coordinate values of the input image using the rounded adjustment parameter; and a display control unit configured to control a display unit for displaying an output image based on image data obtained by the deformation process on the input image by the image deformation processing unit.

2. The image processing apparatus according to claim 1, wherein the image deformation processing unit comprises:

a generation unit configured to generate coordinate information of the input image;

a coordinate transformation processing unit configured to perform the coordinate transformation processing including the division operation on the coordinate information using the rounded adjustment parameter; and an interpolation processing unit configured to perform an interpolation operation on a pixel value of a transformed pixel based on coordinate information of the transformed pixel, which is obtained by the coordinate transformation processing.

3. The image processing apparatus according to claim 2, wherein the coordinate transformation processing unit transforms coordinate information of an output image to coordinate information of an input image by an inverse coordinate transformation using the rounded adjustment parameter.

4. The image processing apparatus according to claim 1, wherein the coefficient calculation unit determines whether a value, which is obtained by multiplying a maximum value of the divisor calculated by the divisor calculation unit by the ratio, exceeds a maximum value of the range of the divisor obtained by the coefficient calculation unit, and if the value does not exceed the maximum value of the range of the divisor, outputs the ratio, and if the value exceeds the maximum value of the range of the divisor, outputs a signal to notify of an error.

5. The image processing apparatus according to claim 1, wherein the coordinate transformation includes a projection transformation.

6. An image processing method of an image processing apparatus that generates an output image by a deformation process including a coordinate transformation on an input image, the method comprising:

inputting a deformation parameter;

calculating a minimum value of a divisor for the coordinate transformation based on a deformation parameter on the input image, in accordance with a divisor used in a division operation for the coordinate transformation based on the deformation parameter on a maximum coordinate value and a minimum coordinate value among a plurality of coordinate values in the input image;

based on a relation between a divisor and an error in a division operation, obtaining a range of the divisor in a way that a result of the division operation becomes equal to or smaller than an allowable error, and calculating a ratio by dividing a minimum value of the range by the minimum value of the divisor;

calculating an adjustment parameter, used in the coordinate transformation on the input image, based on a result of multiplying the deformation parameter by the ratio;

executing round processing on the adjustment parameter;

performing the deformation process including the coordinate transformation of the plurality of coordinate values of the input image using the rounded adjustment parameter; and controlling a display unit for displaying an output image based on image data obtained by the deformation process on the input image.

7. The image processing method according to claim 6, wherein the deformation process comprises:

generating coordinate information of the input image;

performing the coordinate transformation processing including the division operation on the coordinate information using the rounded adjustment parameter; and performing an interpolation operation on a pixel value of a transformed pixel based on coordinate information of the transformed pixel, which is obtained by the coordinate transformation processing.

8. The image processing method according to claim 7, wherein the coordinate transformation processing transforms coordinate information of an output image to coordinate information of an input image by an inverse coordinate transformation using the rounded adjustment parameter.

9. The image processing method according to claim 6, wherein calculating the ratio includes determining whether a value, which is obtained by multiplying a maximum value of the divisor by the ratio, exceeds a maximum value of the range of the divisor, and if the value does not exceed the maximum value of the range of the divisor, outputting the ratio, and if the value exceeds the maximum value of the range of the divisor, outputting a signal to notify of an error.

10. The image processing method according to claim 6, wherein the coordinate transformation includes a projection transformation.

11. A non-transitory computer readable storage medium storing a program for causing a computer to execute the image processing method described in claim 6.

* * * * *